(No Model.) 7 Sheets—Sheet 1.

F. H. RICHARDS.
WEIGHING MACHINE.

No. 570,291. Patented Oct. 27, 1896.

Witnesses:
R. W. Pittman
Fred. J. Dole.

Inventor:
F. H. Richards.

(No Model.) 7 Sheets—Sheet 2.

F. H. RICHARDS.
WEIGHING MACHINE.

No. 570,291. Patented Oct. 27, 1896.

Witnesses. Inventor:
R. W. Pittman F. H. Richards.
Fred. J. Dole.

(No Model.)

F. H. RICHARDS.
WEIGHING MACHINE.

No. 570,291. Patented Oct. 27, 1896.

Witnesses:
R. W. Pittman.
Fred. J. Dole.

Inventor:
F. H. Richards.

(No Model.)　　　　　　F. H. RICHARDS.　　　7 Sheets—Sheet 5.
WEIGHING MACHINE.

No. 570,291.　　　　　　　　　　　Patented Oct. 27, 1896.

Witnesses:
R. W. Pittman
Fred. J. Dole.

Inventor:
F. H. Richards.

(No Model.) 7 Sheets—Sheet 6.

F. H. RICHARDS.
WEIGHING MACHINE.

No. 570,291. Patented Oct. 27, 1896.

Witnesses:
R. W. Pittman
Fred. J. Dole.

Inventor:
F. H. Richards.

(No Model.)  7 Sheets—Sheet 7.

F. H. RICHARDS.
WEIGHING MACHINE.

No. 570,291. Patented Oct. 27, 1896.

Witnesses:
R. W. Pittman
Fred. J. Dole.

Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 570,291, dated October 27, 1896.

Application filed April 6, 1896. Serial No. 586,346. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to automatic weighing-machines; and one of its objects is to provide an improved beam mechanism so organized relatively to its supported bucket or load-carrying receptacle that the latter will be maintained in a true vertical path throughout a cycle of movements of the operative parts of the machine.

Another object is to provide improved valve mechanism, embodying as a factor thereof a stream-controlling valve, the actuating mechanism of which during the major period of the operation of the machine is disconnected from the valve, so that the valve and its sustained mass of material can exert no force on any of the working parts of the machine, and cannot thereby vitiate the accuracy of said machine.

Figure 1:
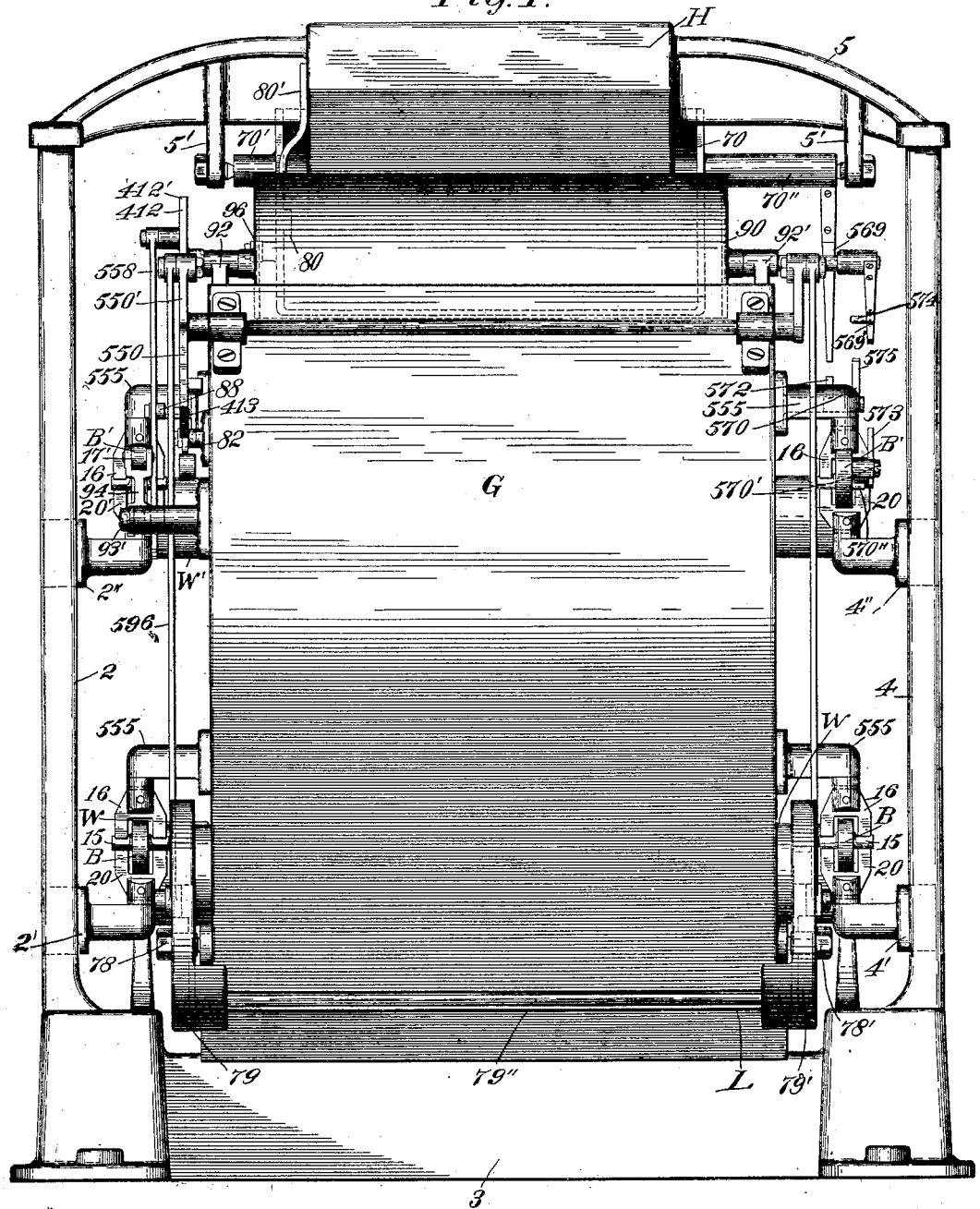
Figure 2:
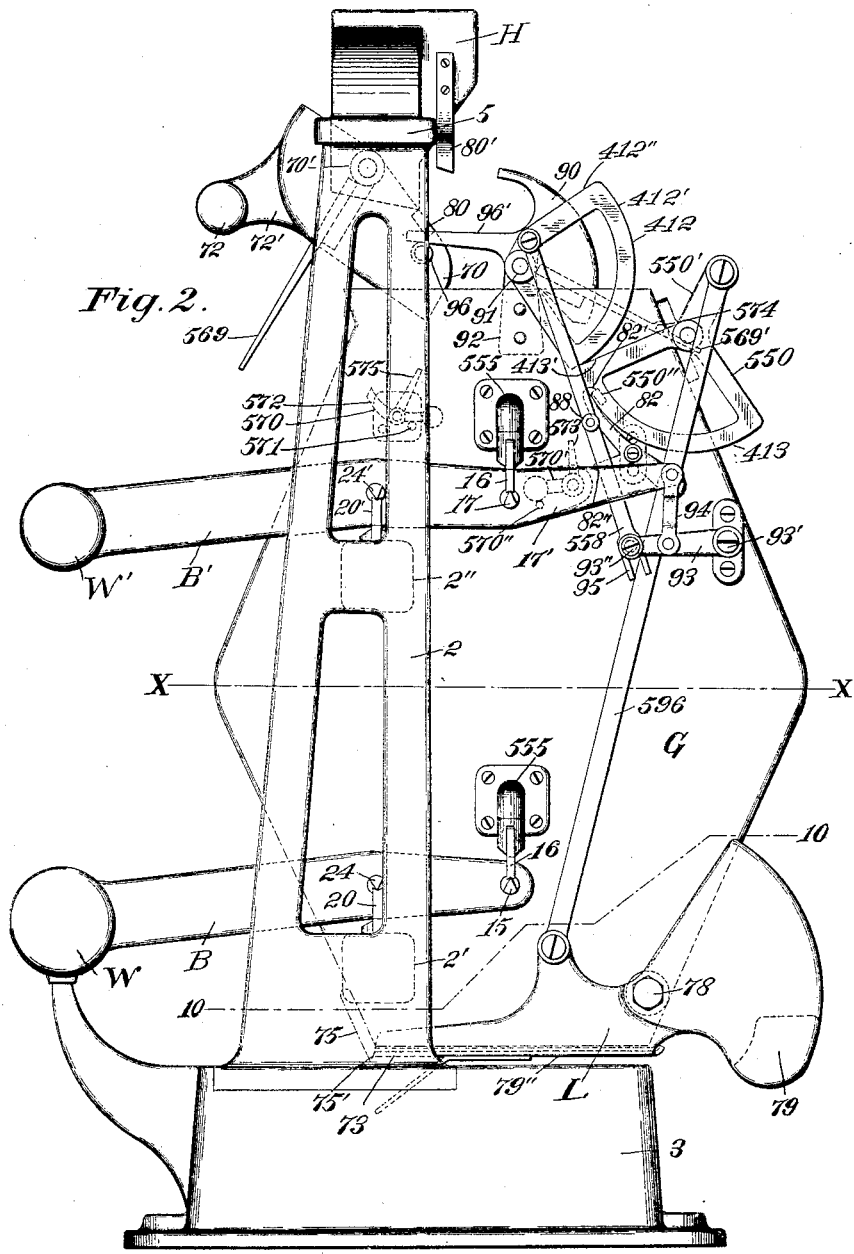
Figure 3:
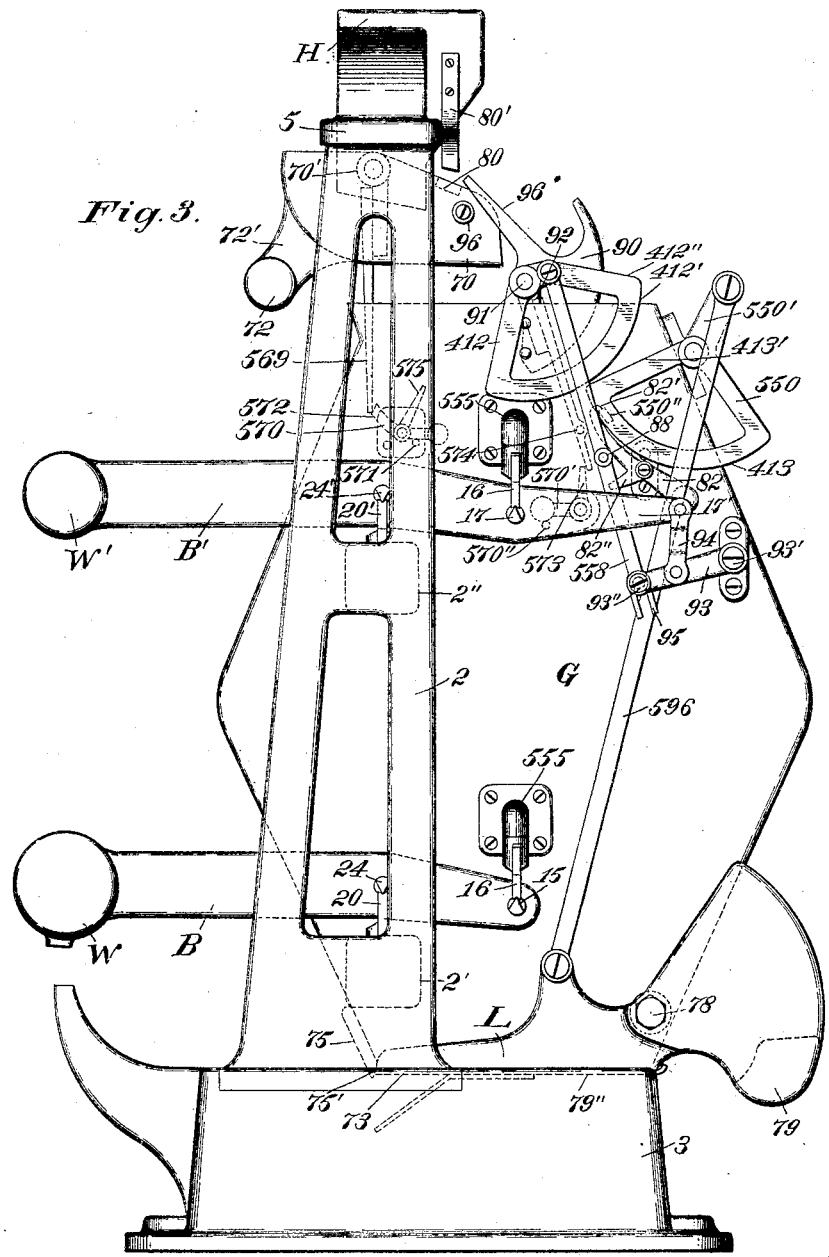
Figure 4:
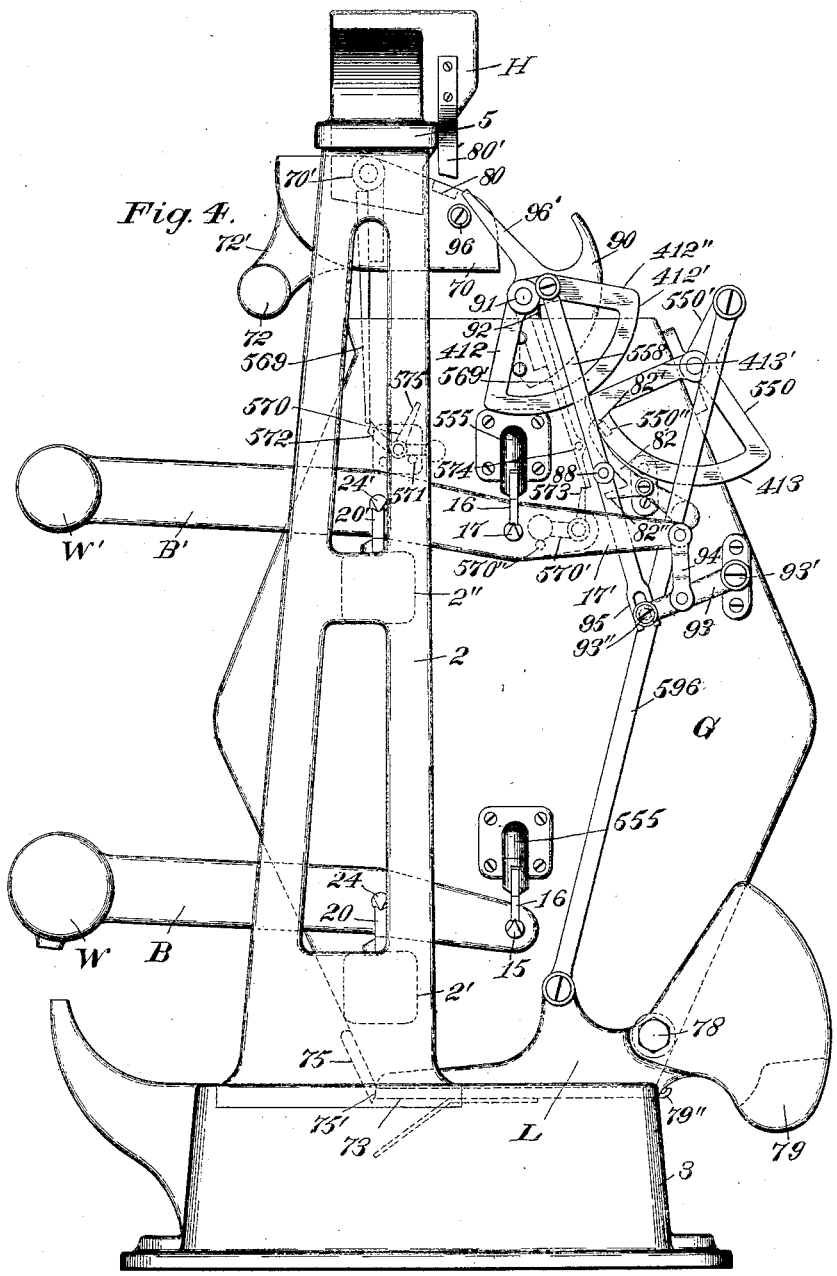
Figure 5:
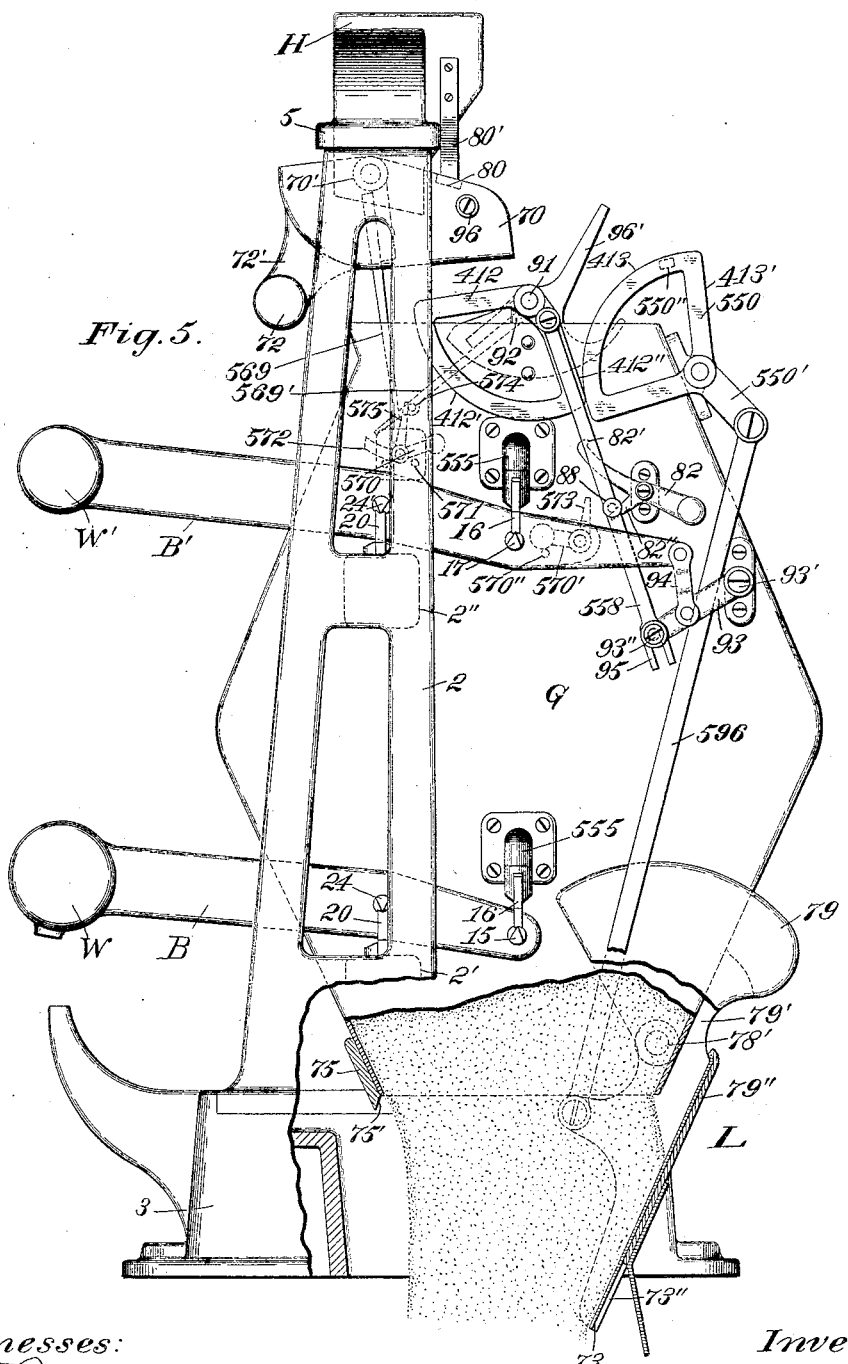
Figure 6:
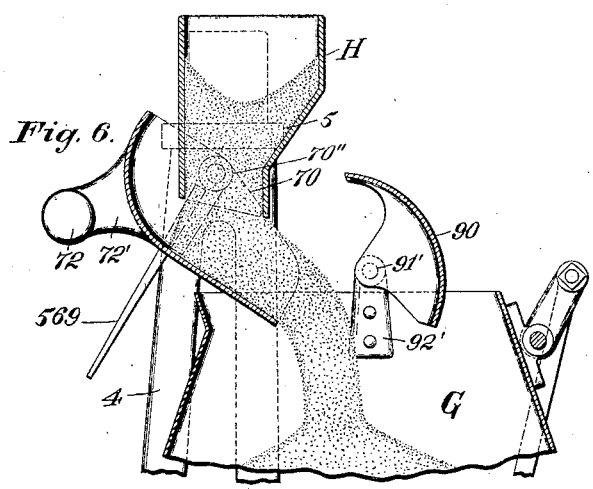
Figure 7:
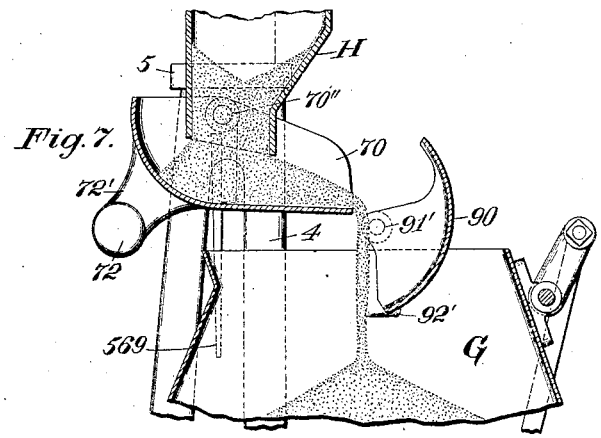
Figure 8:
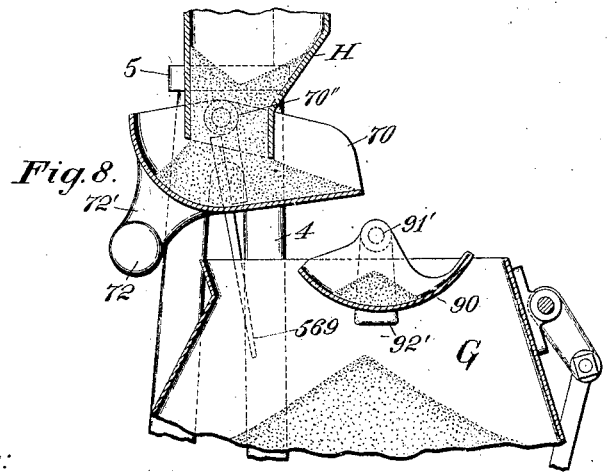
Figure 9:
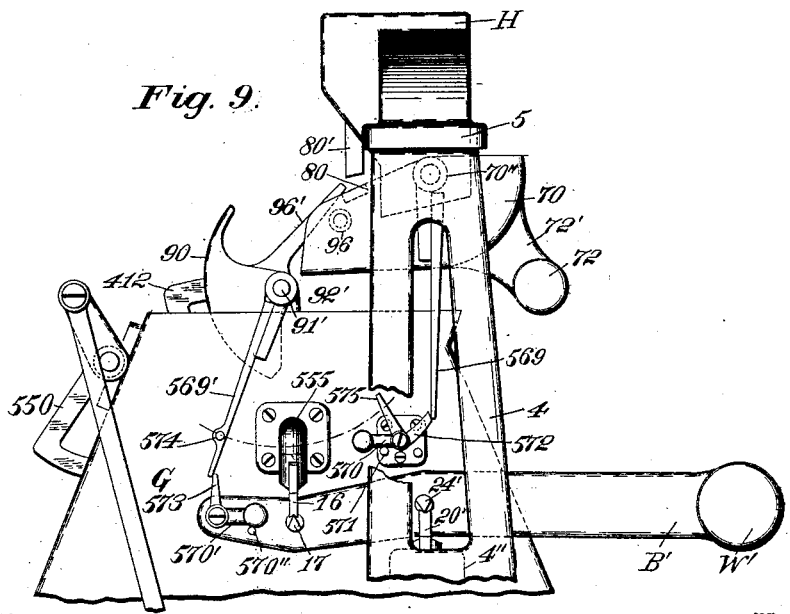
Figure 10:
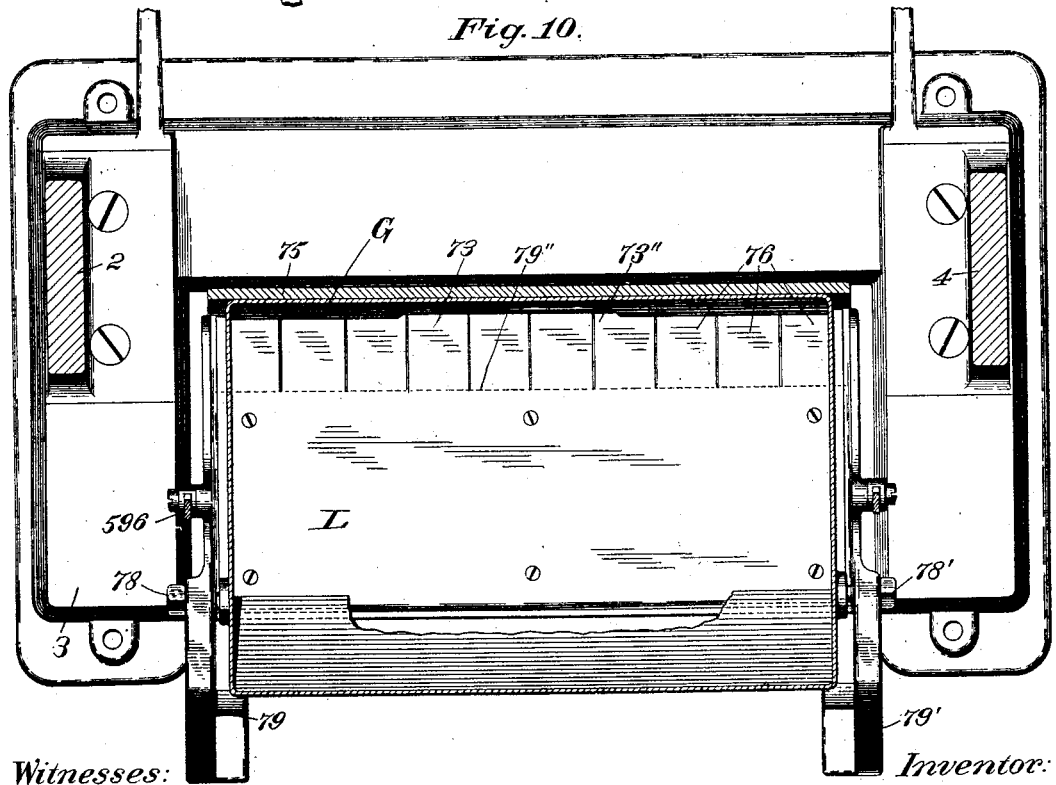

In the drawings accompanying and forming part of this specification, Figure 1 is a front elevation of my improved weighing-machine in the preferred embodiment thereof, illustrating the positions assumed by the various operative mechanisms at the commencement of operation of the machine. Fig. 2 is an end elevation of the machine as seen from the left hand in Fig. 1, said mechanisms being in corresponding positions. Figs. 3, 4, and 5 are similar views, illustrating the successive positions occupied by said parts at the commencement and close of the poising or drip period and during the load-discharging period. Figs. 6, 7, and 8 are end elevations of the upper part of the machine the chute, the valves, and the bucket, said valves being in positions corresponding, respectively, with Figs. 2, 3, and 5. Fig. 9 is an end elevation of the upper part of the machine as seen from the right hand in Fig. 1, and illustrates certain of the controlling members for the valve mechanism. Fig. 10 is a transverse section on the line 10 10, Fig. 2, illustrating more particularly the peculiar construction of bucket-closer.

Similar characters designate like parts in all the figures of the drawings.

The framework for supporting the various operative mechanisms and devices of the machine may be of any suitable or preferred form, but it is herein illustrated comprising the two end frames or members 2 and 4, mounted upon the end walls of the supporting-base 3. The two side frames are also shown connected at their top by the plate or beam 5, which latter is illustrated carrying the supply chute or hopper H, of usual construction, and which is adapted for containing the mass of material to be weighed, said chute to be supplied therewith in some suitable manner.

It is important that swaying or tilting of the bucket during the operation of the machine should be prevented for divers reasons, among which reasons may be mentioned the constant grinding of the knife-edges on their bearings, and vice versa, which, as will be clearly obvious to persons familiar with this class of machines, and more especially when these are of large capacities, amounts to considerable, and which so wears these members that they require constant regrinding and truing. Again, the continual jarring, caused by undue swaying of the bucket, is quite liable to displace, and frequently does displace, operating parts of the machine, and hence impairs its accuracy. With my improved beam mechanism (herein illustrated in its preferred embodiment) these and difficulties of a similar nature are entirely removed and the value of the machine as a precise weighing medium is materially enhanced. Said beam mechanism embodies two coöperating and independent scale-beams, one of which is disposed above the other, and which during the operation of the machine, in addition to their usual function, serve as bucket-guides and positively maintain said bucket in a true, vertical path during its ascending and descending movements.

The scale-beams are designated, respectively, by B and B', and are illustrated as having the usual counterweights W and W'. The bucket-supports on the scale-beams B and B', which consist in the present instance of knife-edges or knife-edge pivots, will preferably be in vertical alinement, and the bearings for said knife-edges will also preferably be located at opposite sides of a horizontal line intersecting the center of gravity of the loaded bucket, as indicated by the dotted line x x, Fig. 2.

The side frames 2 and 4 are shown carrying the blocks 2' and 4', respectively, which may be cast integral therewith, and which are shown provided with beam-supports (herein illustrated as V-shaped bearings 20) on which the scale-beam B is pivotally supported, the oppositely-extending knife-edges 24, which rest on said V-shaped bearings, being shown for this purpose. Said side frames are also shown provided with a second pair of blocks, which are designated by 2'' and 4'', respectively, and which also carry beam-supports (herein shown as V-shaped bearings 20') on which the scale-beam B' is pivotally supported, the oppositely-disposed knife-edges 24', carried by the scale-beam B', serving as beam-pivots. A series of bucket-supports are also shown consisting of knife-edges respectively carried by the scale-beams B and B', and by which the bucket (designated in a general way by G) is pivotally supported. The knife-edges for the beam B are designated by 15 and those for the beam B' are designated by 17. The bucket is also shown provided with a series of hangers or brackets corresponding in number with the bucket-supports, and which are designated by 555, a pair of said hangers being suitably secured to the opposite end walls of the bucket. Said hangers are illustrated carrying V-shaped bearings 16, pivotally mounted on the bucket-supports 15 and 17, respectively, of the two scale-beams B and B'.

The weighing-machine embodies the usual poising and counterpoising mechanisms. All that part of the beam mechanism located to what is herein shown as the "right" of the beam-supports, including the bucket, constitutes the poising mechanism, and all that part of the beam mechanism located at the opposite side of said beam-supports constitutes the counterpoising mechanism.

The bucket mechanism comprises two members, one of which is shiftable relatively to the other for discharging the bucket-load, and the closer (designated in a general way by L) is herein shown constituting such shiftable bucket-discharge member.

In the embodiment thereof, herein illustrated, the closer comprises the counterweighted end plates 79 and 79', connected by the approximately flat plate 79''.

As a means for supporting the bucket-closer, the end plates thereof are shown pivoted at 78 and 78' to the opposite end walls of the bucket G, said plates serving as a means for returning the closer to its normal or shut position, as indicated in Fig. 2.

The closer proper is shown at 73, consisting of a resilient or bendable plate suitably secured to the connecting-plate 79''. The closer-plate is also illustrated having formed thereon a series of slits or kerfs 73'', extending inward from the discharge edge thereof, by which a series of spring tongues or members 76 are formed. (See Fig. 10.) By reason of this peculiar construction, should a lump of material lodge on or adhere to any one of the series of such spring-tongues on the return movement of the closer, such tongue will yield or "give" when its movement is resisted—for example, by the bucket—and by such action permit the tight shutting of the remainder of the series against the bucket, and the sequential operation of the closer-connected members without loss of time, which in practice is a matter of considerable moment. On the initial opening movement of the bucket-closer such spring-tongue will immediately assume, by reason of its springy character, a position in line with the others of the series.

It occasionally happens that at the commencement of flow of the supply-stream into the empty bucket, when it strikes the closer, particles thereof rebound, and in rebounding pass between the discharge edge of the closer and the lower edge of the front bucket-wall and are thereby wasted. For preventing this waste, a guard is illustrated, which in the present instance consists of a plate 75, approximately equaling in length the width of said bucket-wall, and suitably secured thereto adjacent to its lower edge. This guard-plate 75 is shown having an oblique or inclined guide-face 75', against which the spring-tongues of the closer impinge when the latter has nearly reached its normal position, and so that at this point a perfectly-tight joint is secured. It will be obvious also that should any one of the spring-tongues 76 be abnormally bent the guard-plate 75 will still prevent waste at this point.

As a means for sustaining the bucket-closer L, an inverted toggle is shown consisting of a segmental rocker 550, pivotally supported to the upper forward side of the bucket-wall, and having a relatively long connecting-rod 596, pivotally connected to the rocker-arm 550', and also to the closer L in such a manner that when said closer is in its normal or shut position the three toggle-pivots will be virtually in line, Fig. 2, so that when the rocker or toggle member 550 is engaged by a latch or analogous device the closer L will be held against opening movement by a minimum pressure on said latch, as practically the entire weight of the bucket contents will be supported by the rocker-pivot.

The latch for the bucket-closer is designated by 82, and is shown pivotally supported on the bucket, and also having at one of its ends a stop or detent 82', operable for engaging a coöperating stop or detent 550'', formed on or secured to the rocker 550, the latch being preferably counterweighted for maintaining this engagement of the two described detents. The latch is also depressible for disengaging said detents, and when this action takes place the closer is free of all restraint, so that the bucket-contained mass may force the same open.

As a means for controlling the stream of material which flows from the supply chute or hopper H, a valve of the type disclosed by Letters Patent No. 535,727, granted to me March 12, 1895, to which reference may be had, is herein illustrated. Said stream-controlling valve is designated by 70, and is shown having the rock-arms 70' and 70'' projecting laterally from its end walls, said rock-arms being illustrated pivotally supported between the arms or brackets 5', depending from the top plate 5. The valve when closed should project sufficiently far beyond the front wall of the chute to support the descending column or stream of material in said chute.

For effecting the closure of the stream-controlling valve any suitable mechanism may be employed. The means herein illustrated for this purpose comprises a counterweight 72, formed on the end of an arm 72', projecting rearward from the valve; and said counterweight or valve-closer 72 should exert a force slightly exceeding that of the pressure of the flowing stream, said valve being, as will be understood, in the nature of a normally-closing valve. When the valve has reached the stream-cut-off position, it is desirable that its further movement should be intercepted, and for accomplishing this result the means herein illustrated may be employed.

The inner wall of the valve 70 is shown provided with a projection 80, which abuts against the depending stop-arm 80', rigidly secured to the supply-chute H, thereby indicating that the valve has reached the limit of its effective movement and the supply-stream is cut-off. For opening the valve, the mechanism hereinafter more particularly described will preferably be employed.

In weighing-machines of the single-valve type particles of the valve-sustained mass are usually projected therefrom when said valve has reached its stream-cut-off position, this action being due to the jar caused by the quickly-closing valve. Such dislodged particles of course drop into the loaded bucket, and are consequently wasted. This loss is quite small; but, constantly recurring, it is obvious that after a long period of time it becomes quite appreciable. It is therefore an aim of my present invention to prevent this loss of material. For accomplishing this end a drip-valve supported independently of and movable below the stream-controlling valve 70 is herein illustrated, and which catches and retains such valve-dislodged particles.

The drip or drip-retaining valve is designated by 90, and is shown mounted on the bucket G for oscillation, the pivots or journals 91 and 91' projecting laterally from the valve-end walls working in bearings formed in the bucket-brackets 92 and 92', constituting a suitable means for supporting the drip-valve. The drip-valve 90 will preferably have a closing movement in synchronism with the final closing movement of the stream-controlling valve, which movements occur when the bucket has passed below the poising line, signifying the completion of a bucket load, so that said drip-valve may catch and retain the dropping particles or drizzle from the stream-controlling valve 70, which form a part of the succeeding bucket load, said particles being discharged by the drip-valve into the empty bucket immediately on the opening movement of said last-mentioned valve. The drip-valve 90 is also shown dished or concaved, so that when in its closed position it accommodates without possibility of escape a considerable quantity of valve-dislodged material.

During the major period of operation of the machine the drip-valve 90 will occupy substantially a vertical position, serving also as a guard for preventing scattering of the mass during the flow of the supply-stream into the bucket; and at no time during its closing movement does the drip-valve come in contact with the flowing stream, thereby permitting its unobstructed movement.

The drip-valve 90 is in the nature of a gravity-valve, it being adapted to close by its own weight and under the discharge-edge of the stream-controlling valve. During the principal period of operation of the machine the drip-valve 90 will be slowly closed, but, as hereinbefore stated, it does not come in contact with the running stream of material except during the final closing movement of the stream-controlling valve, for effecting the peculiar results to which allusion has been made. At the commencement of the poising period both of these valves will be preferably held against further closing movement to permit the flow of the drip-stream, reduced to a very small volume by reason of the closure of the valve 70 into the bucket, the purpose of said drip-stream being to complete the partial load in the bucket. On the completion of the bucket load the bucket, with its supporting-beam mechanism, will descend below the poising line; this action releasing both valves, which simultaneously close, the drip-valve moving under the stream-controlling valve.

The projecting pivot or trunnion 91 of the drip-valve 90 is shown carrying a segmental member 412, the peculiar function of which will be hereinafter described, and to which is eccentrically connected the depending rod 558, which constitutes a means for transmitting an upward thrust, through the intervention of a suitable member, to the drip-valve 90, whereby it may be opened, as will now be described. As a means for obtaining this valve-opening thrust, I prefer to utilize the upward movement of the scale-beam B', this being, as will be clearly evident, in the nature of a valve-actuator.

A relatively-short lever is shown at 93 fulcrumed or pivoted at 93' to the bucket G and having at its free end an inward-projecting pin or projection 93''. This short lever 93 is shown operatively connected with the extended arm 17' of the beam B' by the link 94, and it will be obvious that by virtue of this connection said lever 93 may ascend and descend in unison with the connected scale-beam B'.

The connecting-rod 558 is shown having formed at its lower end the bifurcation or fork 95, which embraces or straddles the projection 93'', so that the lever 93 serves as a means for engaging and transmitting the valve-opening thrust of the beam B' to the connecting-rod 558, and also as a guide for said rod, thereby maintaining it in its operative position. The operation of these connected parts is as follows: On the descending movement of the scale-beam, it will be remembered that the lever 93 descends in unison therewith, and its projection 93'', falling from under the connecting-rod 558, permits the slow closing movement of the drip-valve 90. On the descending movement of this scale-beam B' it will be obvious that it acts practically as a stop through its connected devices for limiting or checking the too rapid closing movement of the drip-valve. On the ascending movement of said beam the operation just described will be exactly reversed, so that an upward thrust is imparted to the connecting-rod 558 sufficient for insuring the immediate opening movement of the valve 90. The stream-controlling valve 70 will be preferably opened from and by the power of the opening drip-valve 90, and the means shown for attaining this result will now be described. The closed positions of the two valves are illustrated in Fig. 5, the drip-valve 90 being disposed approximately horizontally and below the stream-controlling valve 70.

The stream-controlling valve 70 is shown having on one of its end walls the projection 96, which is disposed in the path of movement of an actuator operative with the drip-valve. In the form illustrated this actuator consists of the arm 96' preferably formed integral therewith. On the opening movement of the drip-valve 90 through the agency of the upward-moving beam B' this arm 96' will engage the projection 96 on the valve 70, to thereby open the latter, whereby the flow of the supply-stream into the bucket G will be caused.

It will be apparent that in the embodiment herein illustrated valve-actuating mechanism is provided, which is normally disconnected from the stream-controlling valve, so that the weight of the valve and its load are at no time thrown on any of the operating parts of the machine, except, of course, when the bucket is empty and rises, and this, as will be clearly apparent, can in no wise affect the accuracy of the machine.

In connection with the drip-valve and shiftable bucket-discharge member, which is herein illustrated as the bucket-closer L, reciprocally-effective stops are employed operative, respectively, with said members. The valve-operative stop is designated by 412, and the rocker 550 is shown constituting the closer-operative stop. Each of said stops is shown provided with a curved stop-face concentric with the axes of movement thereof, and which are designated, respectively, by 412' and 413, and with a second pair of stop-faces 412'' and 413', which are shown as straight. The peculiar action of these coacting stops is as follows: The drip-valve 90 being in its open position, as indicated in Fig. 2, the stop-faces 412' and 413' will be in contact, so that should the closer-latch be accidentally or prematurely tripped the closer L will be prevented from opening by the blocking of the oscillatory movement of the closer-connected stop or rocker 550 by the stop 412, the thrust of which is directed against the pivot of said stop 412, and this peculiar action will continue while these two stop-faces 412' and 413' are in contact. The contact or approximate contact of the stop-faces 412' and 413' continues until the load in the bucket is fully completed. When, however, the stop 412 has intersected the plane of curvature of the stop-face 413, it will be evident that the stop 550 may oscillate, provided, of course, the latch 82 has been depressed and disengaged therefrom. When these stop-faces have passed out of contact, the closer will be opened for permitting the discharge of the bucket load. As the closer opens, the stop 550 will be simultaneously rocked about its pivot thereby, and its stop-face 413 will ride over and in contact with the straight stop-face 412'', so that any tendency of the drip-valve 90 to open will be effectually resisted by the stop 550, which is in the nature of a fixed abutment. The stop 412, the movement of which is prevented by the closer-connected stop 550, also tends to hold the beam B' down, through its connections therewith, while the closer is open and the two stop-faces 412'' and 413 are in contact. As the closer L resumes its normal position, the return oscillation of the stop 550 is effected through the medium of the connecting-rod 596, and on such movement, when it has intersected the plane of curvature of the stop-face 412', said scale-beam B is released and the drip-valve 90 may be opened thereby through said connections, as said beam returns to its normal or horizontal position, and will also, through its actuating-arm 96', which engages the projection 96 on the stream-controlling valve 70, open the latter.

From the preceding description it will be evident that by virtue of the coacting stops hereinbefore referred to the drip-valve 90, and likewise the stream-controlling valve 70, cannot be opened while the closer is open and the bucket is discharging its load, and that said closer cannot be opened while either of the valves are open and any part of the supply-stream is flowing into the bucket.

It will be remembered that the invention contemplates the provision of means for intercepting the two valves at a predetermined point in the closing movement thereof, for the purpose of permitting the flow of a drip or reduced stream of material into the nearly-loaded bucket, and the means shown for this purpose will now be described.

The bucket G is shown carrying the pivoted latch or lever 570, the counterweighted arm of which normally rests on the stop or pin 571, so that the latch stop-arm 572 will be maintained in the path of movement of the valve stop-rod 569, which is carried by and oscillatory with the stream-controlling valve 70. At a predetermined point in the closing movement of said valve its depending stop-rod 569 will be engaged by the stop-arm 572 of the latch 570, so that said valve may be thereby held against further closing movement.

For releasing the valve 70, means operative with the drip-valve 90 will preferably be employed, so that these valves may simultaneously close.

The short arm of the beam B' is shown provided with a by-pass, which consists in the present instance of a pivotally-supported angle-lever 570', the horizontal arm of which is shown counterweighted and normally resting on the projection 570'', the vertical arm 573 intersecting the arc described by the lower end of the drip-valve stop-rod 569'.

At a predetermined point in the closing movement of the drip-valve its stop-rod 569' will be engaged by the vertical arm of the by-pass 570', whereby said valve will be held against further movement, the discharge-edge thereof being then adjacent to the drip-stream. When the two valves are held as thus described, the drip-stream will flow into the bucket for a limited period of time.

On the completion of the bucket load by the drip-stream, the beam mechanism with the loaded bucket will descend below the poising line, the stop 570' being also carried by the beam B' below the stop-rod 569', whereby the drip-valve is released, and closes. The stop-rod 569' is shown provided with a lateral projection or pin 574, so that on the release of the drip-valve 90 in the manner just described said stop-rod 569' will swing to what is herein shown as the "right" in Fig. 9, and the projection 574 thereon will be carried into contact with the lever-arm 575, so that the latch 570 will be oscillated about its pivot thereby and the stop 572 thereof disengaged from the valve stop-rod 569, whereby the stream-controlling valve 70 will be released and instantly closed by its counterweight 72 to cut off the drip-stream. It will also be evident that during the last-mentioned movement of the drip-valve—that is to say, when released—it will drop by gravity under the discharge-edge of the stream-controlling valve 70, so that any particles dropping from the latter will be caught by the former, and thereby prevented from entering the loaded bucket.

On the opening movement of the drip-valve 90 its depending rod 569' will engage the vertical arm of the by-pass 570', and, swinging the latter about its pivot, is thereby permitted to resume its normal or open position. The same action takes place on the opening movement of the stream-controlling valve 70. Its stop-rod 569 will engage the arm 575 and swing the latch 570 about its pivot, so that said valve may be fully opened to permit the flow of the supply-stream into the bucket.

It will be remembered that a latch 82 has been described for normally holding the bucket-closer L against opening or discharge movement by the engagement of a detent thereon with a coöperating detent on the rocker 550. For effecting the disengagement of these detents an actuator operative with and by the power of the closing drip-valve 90 will be preferably employed, and such actuator is herein illustrated as a projection 88, laterally extending from the connecting-rod 558 and carried by or formed thereon. When the drip-valve 90 has nearly reached the limit of its closing movement, this actuator 88 will be thrust downward into engagement with the stop 82'' on the latch 82, thereby depressing said latch and disengaging the two described detents. On their disengagement it will be evident that the bucket-closer L is free of all restraint, so that it may be forced open by the weight of the bucket-load, and the latter thereby discharged.

The operation of the hereinbefore-described weighing-machine is as follows: Fig. 2 represents the normal positions of the various operative mechanisms at the commencement of operation of the machine, both valves 70 and 90 being open and the closer L latched in its closed position by the latch 82, which engages the closer-connected rocker 550. The valves being open, the supply-stream will flow into the empty bucket G. When a certain proportion of the load has been received by the bucket, it will descend, the beam mechanism descending in unison therewith, and the short lever 93, falling from under the valve-connected rod 558 by and with the scale-beam B', permitting the closing of the drip-valve 90 by gravity, the stream-controlling valve being simultaneously closed by its counterweight 72, these movements continuing up to the poising period. At the commencement of the poising period the stop-rod 569 of the valve 70 will be engaged by the latch 570 and said valve held against further closing movement, Fig. 3, and the drip-valve will also be held against further closing movement by the by-pass 570', which engages the drip-valve stop-rod 569', Fig. 3. The drip-stream, when the two valves 70 and 90 are thus held, may flow into the bucket. On the completion of the bucket-load the loaded bucket, with the beam mechanism, will descend below the poising line, the by-pass 570' being carried with the beam B' in its descent and below the stop-rod 569', this action releasing the drip-valve 90, so that it may close, Fig. 5. On the closing movement of the drip-valve, its rod 569' will swing to the right therewith, Fig. 9, and its projection 574 will be carried into engagement with the arm 575 of the lever 570, so that the stop-arm 572 will be disengaged from the stop-rod 569, the valve 70 being thereby released, Fig. 5, so that it may be closed by its counterweight 72, Fig. 5.

Near the final closing movement of the drip-valve 90, the actuator 88, operative therewith, will be thrust downward into engagement with the stop 82″ of the latch 82, this action depressing said latch and freeing the rocker 550, held against movement thereby, and also freeing the bucket-closer L, so that it may be opened.

Having described my invention, I claim—

1. The combination with a bucket, of a valve; two independent bucket-supporting scale-beams, one of which is disposed above the other; and connections between one of said scale-beams and the valve.

2. The combination with bucket mechanism embodying a shiftable bucket-discharge member, of a chute; a stream-controlling valve therefor; an independent gravity-closing drip-valve normally held out of contact with the flowing stream of material and projectable across the line of flow thereof; and reciprocally effective stops operative, respectively, with said drip-valve and bucket-discharge member.

3. In a weighing-machine, the combination with bucket mechanism embodying a shiftable bucket-discharge member; of a chute; a stream-controlling valve for said chute; a drip-valve supported by the bucket mechanism; and reciprocally effective stops operative, respectively, with said drip-valve and bucket-discharge member.

4. In a weighing-machine, the combination with bucket mechanism embodying a shiftable bucket-discharge member; of a valve supported by said bucket mechanism; and reciprocally effective stops operative, respectively, with said valve and shiftable bucket-discharge member.

5. The combination with a bucket and with beam mechanism therefor embodying a scale-beam; a valve; a relatively short lever supported by the bucket and having a projection; a link connecting said lever and scale-beam; and a rod operatively connected with said valve and having a bifurcation adapted to straddle the projection on said lever.

6. The combination with a chute, of a valve therefor; a second valve provided with a device for operating said first-mentioned valve; two scale-beams, one of which is disposed above the other; and connections between said second valve and one of said scale-beams.

7. The combination with a bucket and with a chute, of a counterweighted stream-controlling valve therefor having a projection; a gravity-closing drip-valve supported by the bucket and provided with an arm adapted to engage said projection on the opening movement of the drip-valve; and means for opening said drip-valve.

8. The combination with a bucket, of a valve; a bucket-supporting scale-beam; a lever supported independently of and operatively connected with said scale-beam; and connections between said lever and valve.

9. The combination with a bucket, of a valve; a bucket-supporting scale-beam; a lever connected to the bucket and operatively connected to said scale-beam by a link; and connections between said valve and lever.

10. The combination with a chute, of a stream-controlling valve therefor; a drip-valve; means for intercepting one of said valves at a predetermined point in the closing movement thereof; and means operative with the other valve for releasing said first-mentioned valve.

11. The combination with a chute, of a stream-controlling valve therefor; a drip-valve; a stop-rod connected to said stream-controlling valve; a device operative for engaging said stop-rod at a predetermined point in the closing movement of said stream-controlling valve; and means operative with the drip-valve for disengaging said device from said stop-rod.

12. In a weighing-machine, the combination with a pair of valves; of a pair of stop-rods operative therewith; a latch for engaging one of said stop-rods; and a projection on the other stop-rod for engaging said latch.

13. In a weighing-machine, the combination with a pair of valves; of a stop-rod operative with each of said valves; a latch for engaging one of said stop-rods; a scale-beam; and a stop carried by said scale-beam for engaging the other of said rods.

14. The combination with a chute; of a valve therefor; a projection on said valve; a bucket; a valve having an arm for engaging said valve projection and supported by the bucket; and means for actuating said last-mentioned valve.

15. In a weighing-machine, the combination with a chute; of a valve therefor; a bucket; a connecting-rod carried by said valve; a scale-beam; a lever for engaging said connecting-rod; and a link operatively connecting said scale-beam and lever.

16. In a weighing-machine, the combination with a chute; of a stream-controlling valve therefor; a rod operative with said valve; a bucket; a valve supported by said bucket; a latch having two arms, one of which is operative for engaging said valve-operative rod; and a rod operative with the other valve and having a projection for engaging the other arm of the latch.

17. In a weighing-machine, the combination with a bucket; of a guard-plate carried thereby, said guard-plate having an oblique guide-face; and a closer embodying a resilient plate which impinges against said oblique face as said closer returns to its normal position.

18. In a weighing-machine, the combination with a chute; of a valve therefor; a bucket and its closer; means embodying a latch for holding said closer against opening movement; a valve supported by said bucket; and a latch-actuator operative with said last-mentioned valve.

19. In a weighing-machine, the combination with a valve having a projection; of a bucket; a valve supported by said bucket and having an arm for engaging said projection; a bifurcated connecting-rod; a scale-beam; and a lever operatively connected with said scale-beam and having a projection which is embraced by the bifurcation of said connecting-rod.

FRANCIS H. RICHARDS.

Witnesses:
FRED. J. DOLE,
BENTON N. PARKER.